Dec. 7, 1943.  E. E. BURLO  2,336,392
HAND MIRROR
Filed April 10, 1943  2 Sheets-Sheet 1
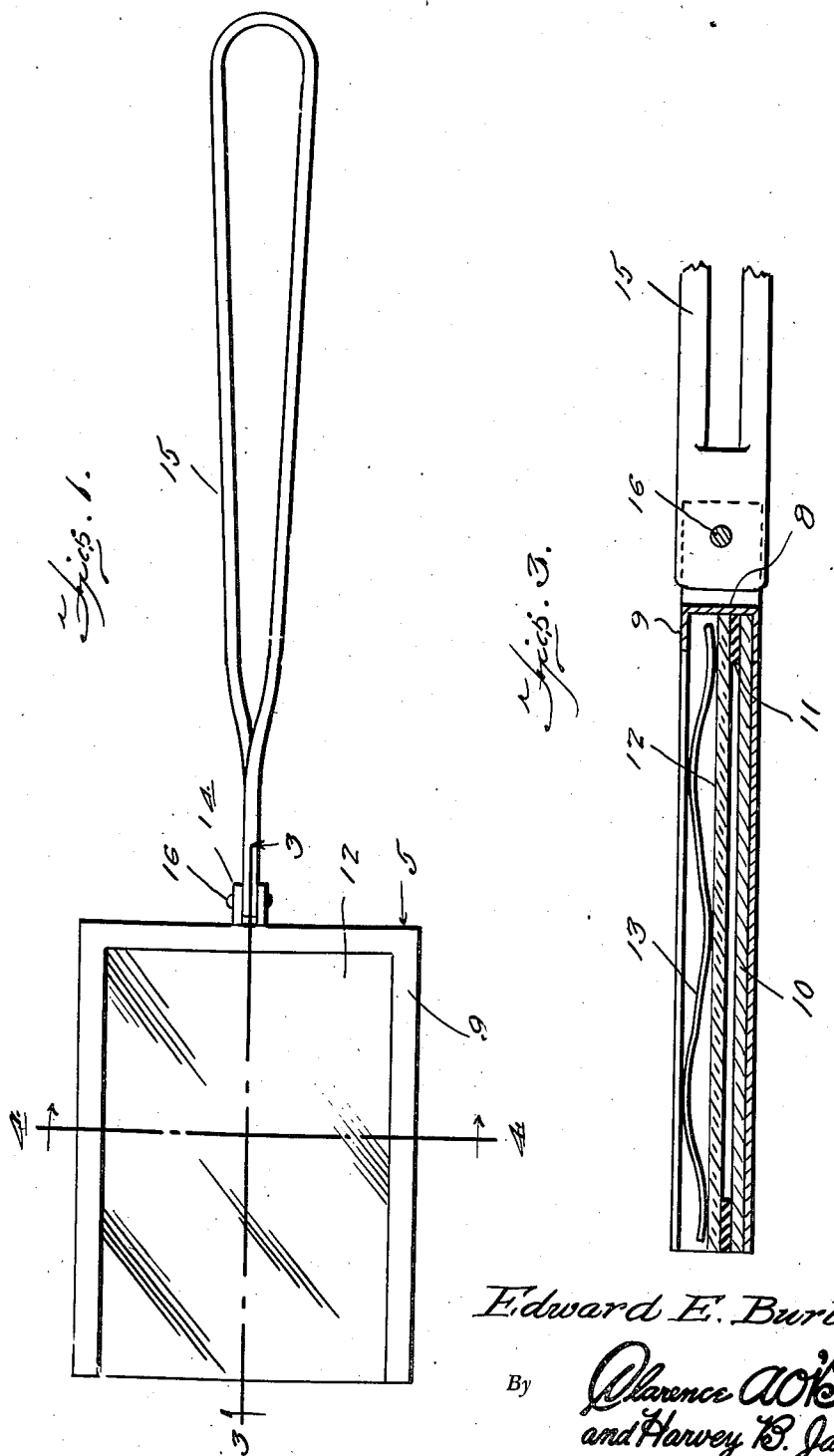
Inventor
Edward E. Burlo
By Clarence A. O'Brien
and Harvey B. Jacobson
Attorneys Dec. 7, 1943.  E. E. BURLO  2,336,392
HAND MIRROR
Filed April 10, 1943  2 Sheets-Sheet 2
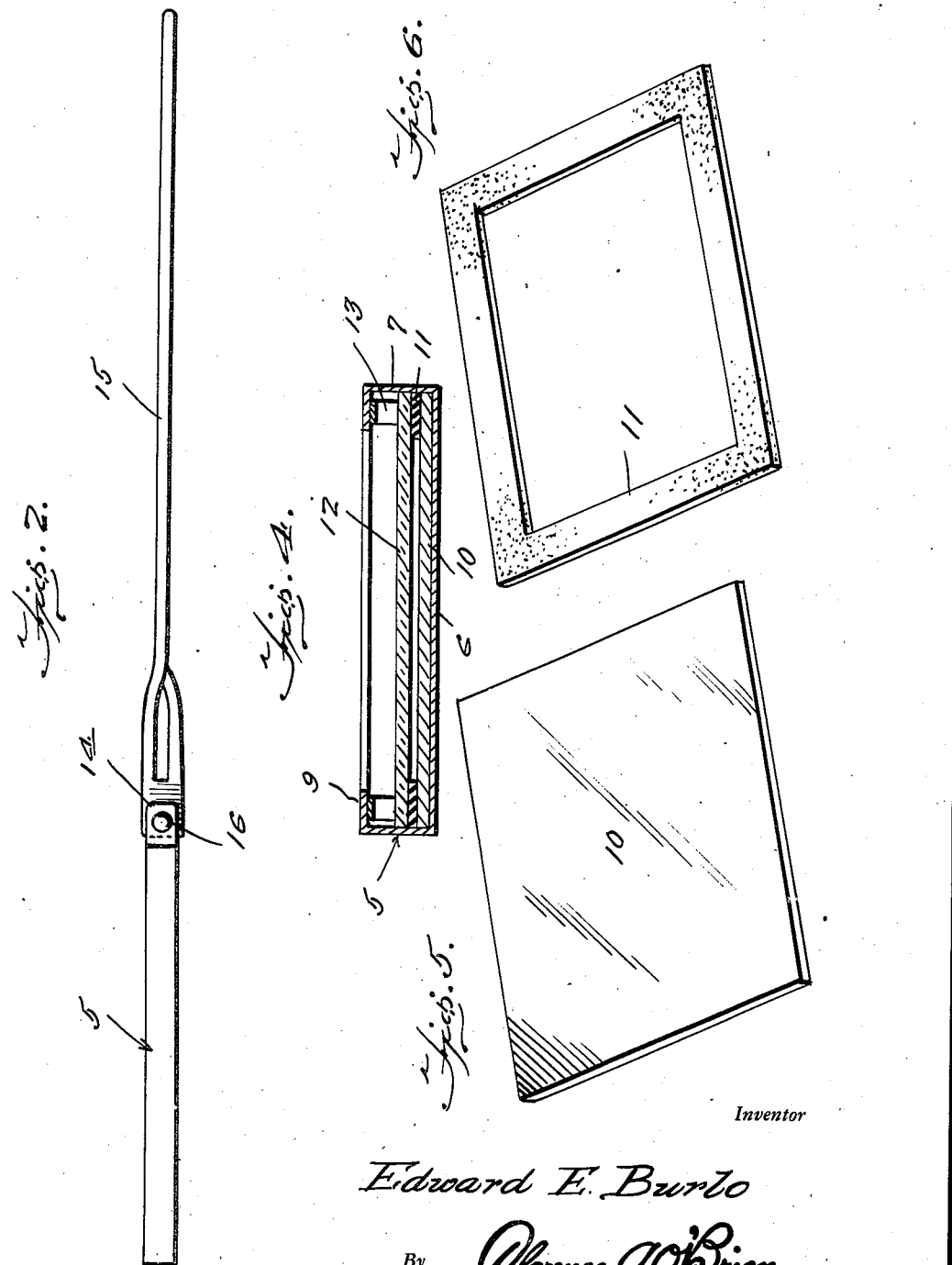
Inventor
Edward E. Burlo
By Clarence A. O'Brien
and Harvey B. Jacobson
Attorneys

UNITED STATES PATENT OFFICE 2,336,392

HAND MIRROR

Edward E. Burlo, Green Bay, Wis.

Application April 10, 1943, Serial No. 482,639

1 Claim. (Cl. 88—104)

The present invention relates to new and useful improvements in mirrors designed particularly for use in examining work in inaccessible places, such as in welding and in adjusting engines and other machinery on their beds, where close inspection of the work is necessary.

An important object of the invention is to provide an adjustable hand mirror which is simple and practical in construction, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which:

Figure 1 is a plan view.

Figure 2 is a side elevational view.

Figures 3 and 4 are sectional views taken respectively on the lines 3—3 and 4—4 of Figure 1.

Figure 5 is a perspective view of the mirror, and

Figure 6 is a similar view of the spacing member for the edges of the mirror.

Referring now to the drawings in detail, the numeral 5 designates a flat pan-like holder which includes a bottom 6, side walls 7 and an inner end wall 8, the outer edge of the holder being open and upper edges of each of the walls being bent inwardly in spaced relation to the bottom to form flanges 9 extending around the two side walls and inner end wall.

A glass or chrome-plated metal mirror 10 is inserted in the open end of the holder under the flanges 9 upon which is then placed a rubber or other resilient spacing frame 11 extending around the edges of the mirror and upon the spacing frame is placed a glass or other transparent cover sheet 12.

The mirror, spacing member and cover sheet are held in assembled relation in the holder by means of leaf springs 13 interposed between the flanges and the upper surface of the cover sheet.

Projecting from the rear edge of the rear wall 8 are a pair of spaced ears 14 between which is pivotally attached a handle 15 by means of a pin or rivet 16, the handle having a snug fit between the ears to frictionally hold the handle and holder in a desired adjustable position. The handle is preferably constructed of wire with its ends brazed, welded or otherwise suitably secured together and flattened into proper form for snugly fitting between the ears of the holder. The wire forming the handle is twisted adjacent its attached end to position the handle co-planar with the holder.

It is believed the details of construction, operation and manner of use of the device will be readily understood from the foregoing without further detailed explanation.

Having described the invention, what is claimed as new is:

A hand mirror comprising a flat holder including a bottom, a pair of side walls and one end wall, the other end of the holder being open, inturned flanges on the side and end walls in spaced relation to the bottom, a mirror inserted in the open end of the holder, a transparent cover sheet on the mirror, a resilient gasket between the mirror and cover sheet at the edges thereof and spacing the same apart, leaf springs between the flanges and the cover sheet yieldably retaining the mirror, cover sheet and gasket in assembled position in the holder, and a handle pivotally secured to the end wall of the holder.

EDWARD E. BURLO.